Patented Feb. 8, 1944

2,341,229

UNITED STATES PATENT OFFICE 2,341,229

PREPARATION OF CROTONALDEHYDE

Martin Mueller-Cunradi, Hellmut Giehne, and Heinz Krekeler, Ludwigshafen-on-the-Rhine, Germany; vested in the Alien Property Custodian No Drawing. Application August 20, 1940, Serial No. 353,384. In Germany August 21, 1939

1 Claim. (Cl. 260—601)

The present invention relates to improvements in the preparation of crotonaldehyde. In particular it relates to the crotonisation of acetaldol by the action of heat on crude acetaldol solutions as obtained in the aldolisation of acetaldehyde.

It is an object of this invention to provide a practical, economical and commercially applicable method for the preparation of crotonaldehyde in a continuous process. It has been known for some time that crotonaldehyde may be prepared by introducing aldol into a boiling dilute acid solution and removing the decomposition products substantially as fast as formed. In order to promote the expulsion of the decomposition products it has also been proposed to carry out the crotonisation under sub-atmospheric pressure while using lower temperatures. The decomposition products of the crotonisation consist substantially of crotonaldehyde and water, provided that the aldol used was free from other constituents. In practice, the decomposition products are admixed with acetaldehyde which is always present in the crude aldol usually employed in the preparation of crotonaldehyde. Hence, during the step of condensing crotonaldehyde and water from the vapors distilling off from the crotonising vessel, care has to be taken that the acetaldehyde is also condensed. When operating under normal pressure, the condensation of acetaldehyde requires a cooling medium of low temperature. In a vacuum process, it becomes necessary to use brine in order to avoid substantial losses of acetaldehyde.

We have now found that the crotonisation of crude aldol may be carried out with excellent yields in a very simple manner, by exposing the liquid aldol to the action of heat in a crotonising vessel under superatmospheric pressure. Generally speaking, the pressure used may only be from 0.5 to 2 atmospheres in excess of atmospheric pressure, though higher pressures may likewise be employed.

In preparing crotonaldehyde according to our invention, crude aldol as obtained by treating acetaldehyde with aqueous alkaline solutions may be admixed continuously with an agent promoting the splitting off of water and be pressed into a fractionating device kept under superatmospheric pressure. The crotonisation products obtained (including acetaldehyde) are separated by fractional distillation under superatmospheric pressure, the crotonisation thus taking place during the fractionation.

Crude aldol may also be introduced continuously into a still connected with a fractionating column kept under superatmospheric pressure, the still being charged with an aqueous solution of a crotonising agent. This solution is heated to a temperature enabling the crotonisation products to be distilled off. The speed of distillation is so chosen that the concentration of the crotonising solution remains substantially constant during the process. The vapors emerging from the solution consisting substantially in an azeotropic mixture of crotonaldehyde and water and in acetaldehyde are separated in the single constituents by means of the fractionating column and obtained in the liquid form. The acetaldehyde obtained may again be used for preparing aldol.

The crotonising agent may be added to the crude aldol before it is introduced into the reaction vessel.

According to our invention it is possible to recover the acetaldehyde which distills off from the crotonizing vessel along with crotonaldehyde and water by passing the vapors through a rectifying still and then condensing the acetaldehyde simply by means of water of ordinary temperature as cooling medium. However, when the crotonization is conducted under normal or sub-atmospheric pressure, special cooling agents are necessary. It is surprising that the speed of crotonisation is not affected by working under superatmospheric pressure and that the crotonaldehyde formed does not undergo any side-reactions.

The following example will further serve to illustrate the nature of our invention, but the invention is not restricted to this example. The parts are by weight.

Example

A solution of 5 parts of primary sodium phosphate in 100 parts of water is kept boiling in a distillation apparatus provided with a rectifying still under a pressure of 0.8 in excess of atmospheric pressure. 160 parts of a mixture of aldol and acetaldehyde, containing 76 parts of aldol, per hour are introduced into the still. A mixture of water, crotonaldehyde and acetaldehyde distils off at the same rate and is introduced into the rectifying still. There are obtained 60 parts of crotonaldehyde per hour, and 84 parts of acetaldehyde per hour, the latter being condensed at 35° C. by means of water of 25° C. as the cooling agent. Crotonaldehyde and water leave the rectifying still in the liquid form. The acetaldehyde is led back for aldolisation.

The primary sodium phosphate in the above process may be replaced by other electrolyte solutions exerting a from acid to neutral reaction. There may be used, for example, diluted mineral acids, organic acids or salt solutions having a from acid to neutral reaction. Preferably, the crotonisation should be carried out in an aqueous solution having a pH-value within the range from 2 to 7. In order that this range is maintained during crotonisation, it is preferable to use electrolyte solutions which have a buffering action within that range. The preparation of such buffering solutions is generally known; we prefer to use, for example, primary and secondary alkali metal phosphates or mixtures thereof or these phosphates admixed with small amounts of free phosphoric acid, or potassium bifluoride or, in case the aldol used has already a weakly acid reaction, sodium acetate.

What we claim is:

In the production of crotonaldehydes by splitting off water from aldol, the step which comprises introducing crude aldol continuously into a boiling electrolyte solution having a pH value of from 2 to 7 under a pressure of from 0.5 to 2 atmospheres in excess of normal pressure and distilling off acetaldehyde continuously from the crotonisation products and condensing the said products under the same pressure.

MARTIN MUELLER-CUNRADI.
HELLMUT GIEHNE.
HEINZ KREKELER.